(12) United States Patent
Pfeifer et al.

(10) Patent No.: US 11,666,945 B2
(45) Date of Patent: Jun. 6, 2023

(54) SORTING SYSTEM FOR LUGGAGE AS WELL AS METHOD FOR SORTING LUGGAGE

(71) Applicant: Siemens Energy Global GmbH & Co. KG, Munich (DE)

(72) Inventors: Philipp Pfeifer, Constance (DE); Eberhard Mandler, Reichenau (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/765,119

(22) PCT Filed: Sep. 16, 2020

(86) PCT No.: PCT/EP2020/075807
§ 371 (c)(1),
(2) Date: Mar. 30, 2022

(87) PCT Pub. No.: WO2021/063676
PCT Pub. Date: Apr. 8, 2021

(65) Prior Publication Data
US 2022/0339672 A1 Oct. 27, 2022

(30) Foreign Application Priority Data
Oct. 1, 2019 (EP) ..................... 19200712

(51) Int. Cl.
*B07C 3/08* (2006.01)
*B07C 3/00* (2006.01)
(Continued)

(52) U.S. Cl.
CPC ............... *B07C 3/08* (2013.01); *B07C 3/008* (2013.01); *B64F 1/32* (2013.01); *B65G 67/08* (2013.01);
(Continued)

(58) Field of Classification Search
CPC ........... B07C 3/008; B07C 3/08; B07C 5/362; B07C 5/38; B65G 67/08; B65G 69/001;
(Continued)

(56) References Cited

U.S. PATENT DOCUMENTS 3,561,623 A * 2/1971 McCaul .................. B64F 1/324
244/137.1
3,610,159 A * 10/1971 Fickenscher ............ B64F 1/368
104/88.05
(Continued)

FOREIGN PATENT DOCUMENTS

DE 3844597 A1 12/1989
DE 10012090 A1 9/2001
(Continued)

*Primary Examiner* — Joseph C Rodriguez
(74) *Attorney, Agent, or Firm* — Laurence A. Greenberg; Werner H. Sterner; Ralph E. Locher (57) ABSTRACT

A sorting system has a sorting area and a controller system that receives luggage-related sorting information for each piece of luggage. A transport mechanism transports the luggage into a sorting area which includes a sorting area with at least one make-up-place connected to the transport mechanism. The make-up-place sorts the luggage according to at least one item of luggage-related sorting information. Movable load devices receive the pieces of luggage sorted by the at least one make-up-place. The controller system assigns each piece of luggage according to at least one luggage-related information to a particular movable load device and the controller system is also adapted to select a make-up-place for each piece of luggage and to send the piece of luggage to the selected make-up-place to be loaded into the assigned movable load device.

17 Claims, 1 Drawing Sheet

(51) Int. Cl.
*B64F 1/32* (2006.01)
*B65G 67/08* (2006.01)

(52) U.S. Cl.
CPC ............... *B65G 2201/0264* (2013.01); *B65G 2203/0258* (2013.01)

(58) Field of Classification Search
CPC .... B65G 2201/0264; B65G 2203/0258; B64F 1/32; B64F 1/368
See application file for complete search history.

(56) References Cited

U.S. PATENT DOCUMENTS

| | | | | |
|---|---|---|---|---|
| 4,244,672 | A | * | 1/1981 | Lund ................... B07C 3/02 |
| | | | | 246/5 |
| 7,021,449 | B2 | | 4/2006 | Koini et al. |
| 10,882,639 | B2 | | 1/2021 | Benthien et al. |
| 2014/0241837 | A1 | * | 8/2014 | Bartelet ................. B65G 1/10 |
| | | | | 414/277 |
| 2017/0008644 | A1 | * | 1/2017 | Dinkelmann ........... G01B 11/02 |
| 2017/0200248 | A1 | * | 7/2017 | Murphy .................. B62B 3/005 |
| 2018/0099751 | A1 | * | 4/2018 | Murphy .................. B64F 1/368 |
| 2018/0155059 | A1 | * | 6/2018 | Thogersen ............. B65G 1/1375 |

FOREIGN PATENT DOCUMENTS

| | | |
|---|---|---|
| DE | 102017127324 A1 | 5/2019 |
| EP | 1498349 A1 | 1/2005 |
| EP | 1995192 A2 | 11/2008 |
| WO | WO 2012022826 A1 | 2/2012 |
| WO | WO 2016107844 A1 | 7/2016 |

* cited by examiner

SORTING SYSTEM FOR LUGGAGE AS WELL AS METHOD FOR SORTING LUGGAGE

FIELD AND BACKGROUND OF THE INVENTION

The Invention relates to a sorting system for luggage as well as a method for sorting luggage.

The term luggage in the context of this application is to be understood as any kind of object, that may be transported along on a vehicle, in particular (but not limited to) on an airplane, ship or train. In particular, luggage may refer to passenger luggage for travel on an airplane like travel bags, suitcases and bulky luggage like wheelchairs, strollers or sports equipment. Luggage and bag(s) is used synonymously in the description.

While the invention is not limited to an application to air travel and airports, it is in the following described in the context of a sorting system of airplane luggage.

Modern airport luggage handling uses so called unit load devices (ULD), that are a pallet or container used to load luggage, freight, and mail on wide-body aircrafts and specific narrow-body aircrafts. ULDs allow a large quantity of cargo to be bundled into a single unit that fits into standardized cargo holds of most airplanes. Since this leads to fewer units to load, it saves ground crews time and effort and helps prevent delayed flights. Each ULD has its own packing list (or manifest) so that its contents can be tracked.

On most commercial airports, passenger luggage is dropped off by the passengers ahead of boarding. However, a fraction of the luggage is dropped off more than a few hours, sometimes even days (if allowed) before departure of the airplane. Consequently, it is not possible to directly load all luggage onto a predetermined number of ULD, but early luggage needs to be stored separately. Thus, currently there are separate tasks of storing early luggage and later loading the ULDs with the early luggage as well as "on-time"-luggage before loading the ULDs onto the airplane. These tasks have different schedules and performance, which can result in delays in the loading process for example if a large fraction of the luggage is early luggage or there are delays in the return of early luggage from storage.

In early bag storage (EBS) more than twice of the needed volume of the biggest standard bag possible is allocated on average for each bag. EBS thus also limits the total amount of luggage that can be loaded on an airplane, because of the allocated safety margins in volume. Thus, EBS is a pure detour in organisation and is costing time, high investment and handling effort. Today the sorting performance for EBS is implemented by a pure baggage handling system (BHS).

Furthermore, the full manual loading of ULDs occupies time and space and is cost intensive and relatively inflexible in schedule. Moreover, depending on the airport, flight destination and the airline provider, the time window allowed for passengers to use EBS may be larger or smaller, meaning the amount of necessary storage time and related work can vary a lot over time leading to delays in luggage loading.

SUMMARY OF THE INVENTION

Task of the invention is therefore to provide an improved sorting system for luggage and a corresponding method that overcomes at least some of the above problems.

According to the present invention, the above task is solved by a sorting system for luggage comprising:

- a transport mechanism which is arranged to transport luggage pieces to be sorted into a sorting area of the sorting system,
- a controller system which is adapted to receive at least one luggage-related sorting information for each luggage piece, wherein the sorting area comprises:

- at least one make-up-place with one or more loading stations connected to the transport mechanism and adapted to sort the plurality of luggage pieces according to at least one luggage-related sorting information,
- a plurality of movable load devices arranged to receive each at least one luggage piece sorted by the at least one make-up-place according to the at least one luggage-related sorting information, wherein the controller system is adapted to assign each luggage piece according to at least one luggage-related sorting information to a particular movable load device, wherein the controller system is adapted select a loading station of a make-up-place for each luggage piece and to send the luggage piece to the selected loading station of the selected make-up-place to be loaded into the assigned movable load device wherein each particular movable load device is arranged to wait at the at least one make-up-place until it moves or is moved to the output area, wherein waiting at the at least one make-up-place comprises waiting at the selected loading station of the selected make-up-place and being routed to a waiting storage in the sorting area if the sorting system does currently not expect further luggage pieces for the particular movable load device and the number of free loading stations at the at least one make-up-place is low or zero.

The sorting system may also comprise

- at least one luggage input adapted to receive a plurality of luggage pieces to be sorted in the sorting system,
- an output area, adapted to receive a plurality of sorted luggage pieces in movable load devices to be transported to different designated means of transportation.

The invention may be called a Compact Floating Storage (CFS). The CFS aims to directly store the incoming luggage into movable load devices (MLDs), which are handled in a (floating) sorting area. The Compact Floating Storage approach can eliminate (separated) early bag storage completely, will enhance performance, reduce complexity of control and improve peak load capacity. Luggage pieces that have been dropped off at the luggage input are handled the same by the luggage sorting system irrespective of the time before departure of the means of transportation at which the luggage piece is dropped off, i.e. they are directly stored in movable load devices, parts of which (e.g. a container carried by the movable load device like a standardized unit load devices) will be later on loaded onto the designated means of transportation. Consequently, no extra temporary storage facilities are necessary for early dropped off luggage.

The means of transportation is preferably an airplane, but may also be a ship or a train. The sorting system for luggage may thus preferably be an airport sorting system for passenger luggage.

In the present invention, the flow of all luggage or bags after passing security and legal processing, is immediately routed to the sorting area. The sorting area (or sorting areas) is structured into different make-up-places or islands (MUP). At the MUPs the luggage pieces are stored into movable load devices (MLD) after sorting of the luggage pieces at the make-up-places. Several MLDs can dock or park in parallel at one MUP and afterwards head in different directions (to different means of transportation/airplanes). One MUP may thus be able to serve several MLDs (and several different means of transportation) in parallel.

The sorting area may thus work with a demand driven control strategy. During the approach of the assigned luggage piece to the sorting area, the designated MLD may already be directed to the selected MUP in a synchronized manner with the assigned luggage piece. Optionally, there may be a small automatic sorting and waiting zone for luggage pieces in front of an MUP. Principally all bags may be kept in flow or at least take no detours on their way to the means of transportation.

At the MUP itself, the luggage pieces may be loaded in a manual, semi-automatic or full-automatic manner (or mixtures thereof) onto the individual MLDs they have been assigned to.

The sorting area may comprise several interchangeably loading MUP, connected to the at least one luggage input via the transport mechanism by routing. Each MUP may provide multiple loading stations for MLDs. The early bag storage is thus made redundant by CFS as the time of drop-off of a luggage piece does no longer lead to a different handling of the luggage piece. Because the sorting system may comprise one or more interchangeable make-up-places and a make-up-place may comprise one or more interchangeable loading stations, an MLD can be positioned freely at any loading station of any MUP. Relevant is that a certain position (be it a certain make-up-place or a certain loading position) is selected for that MLD to be loaded with a luggage-piece according to at least one luggage-related sorting information, it is irrelevant whether that means choosing one of several make-up-places each with only one loading station (selecting a make-up-place is then equivalent with selecting the loading station of the same make-up-place) or whether that means choosing one of several loading stations of a certain make-up-place (in the case when one make-up-place comprises several loading stations). In the following, the first case is often discussed, but the scope of protection also applies to the second case (selecting a loading station). In the second case, each loading station of a make-up-place can be considered as a separate (sub-)make-up-place. Therefore, for simplicity, when in the following it is written that a MLD is moved to and from a certain position, the terms selected make-up-place and selected loading station may be used interchangeably. Relevant for the invention is that it is possible to move an MLD to and from a selected position where it can be loaded.

Individual movable load devices may be moved to and from different make-up-places to load assigned luggage pieces, free up loading stations at make-up-places and load other assigned luggage pieces at another (or the same) loading station later until the movable load device is full or the means of transportation is ready for loading.

The sorting system may further comprise a movable load device storage, where empty movable load devices (preferably holding unit load devices of different standardized sizes) are stored before being routed to a make-up-place on demand.

The sorting system may further comprise a storage outlet for load completed movable load devices for transport to the designated means of transportation (e.g. aircrafts). This is useful for cases where the luggage handling and sorting is finished but the means of transportation cannot yet be loaded (e.g. a delayed arrival of an airplane).

The luggage-related sorting information may be partially or completely provided by the at least one luggage input, e.g. by storing luggage-related sorting information like the destination and/or weight and/or approximate volume and/or special handling flags.

In a preferred embodiment, at least one movable load devices comprise at least one standardized aircraft unit load device. The standardized unit load devices comprise one or more of the following standardized unit load device types: LD-1, LD-2, LD3, LD3 Reefer, LD-4, LD-6, LD-7, LD-7 with Folding Wings, LD-7 with Angled Wings, LD-8, LD-9, LD-9 Reefer, LD-11, LD-26, LD-29, LD-29 Reefer, LD-39, M-1, M-1H, M-2, M-6, M-6(118"H), M-6, MDP, PLA Half Pallet, PMC/P6P Pallet, PNA Half Pallet, Demi. Some or all movable load devices according to the invention may comprise further components to a standardized (aircraft) unit load device. For example, a movable load device may comprise a standardized unit load device according to the above list as well as a (semi-)automatic transport unit carrying the standardized unit load device between the make-up-place and the means of transportation like, e.g., an automated guided vehicle (AGV).

In a preferred embodiment at least one of the movable load devices is a semi-automatic or fully-automatic movable load device. For example, a movable load device may comprise a (standardized) unit load device as well as a (semi-)automatic transport unit carrying the standardized unit load device between the make-up-place (optionally an output area) and the means of transportation (e.g. an airplane). A movable load device may for example comprise an automated guided vehicle or a linear accelerated hovercraft preferably carrying an (exchangeable) standardized unit load device. There may be different automated guided vehicles or linear accelerated hovercraft for different sizes of standardized unit load devices.

In a preferred embodiment the controller system can be adapted to direct the assigned particular movable load device to the selected loading station of the selected make-up-place during the approach of the assigned luggage piece to the sorting area In a preferred embodiment at least some of the movable load devices are arranged to serve as intermediate storage units for sorted luggage pieces that have been dropped off at the luggage input more than a predetermined time before a scheduled departure of the corresponding means of transportation, wherein these movable load devices are arranged to wait at a make-up-place until it moves to or is moved to the output area. Waiting at a make-up-place does not necessarily mean waiting in a docked position in a loading station, but may also mean being routed to a waiting storage in the sorting area if the sorting system does not expect further luggage pieces for the particular movable load device in the next time (e.g. no luggage pieces are assigned to the movable load device) and the number of free loading stations at the make-up-places is low or zero. The waiting storage may be one small waiting zone (waiting area, storage zone) in front of each make-up-place or several make-up-places may share one waiting zone. A predetermined time before a scheduled departure of the corresponding means of transportation may for example be 2 hours, 3 hours or 4 hours before a scheduled departure of the corresponding means of transportation, i.e. before a standard luggage drop off period for the means of transportation starts. This and all other preferred embodiments are not limited to luggage pieces that have been dropped off more than a predetermined time before a scheduled departure, but can also be applied to luggage that has been dropped off during the standard luggage drop off period for the means of transportation.

In a further preferred embodiment, the transport mechanism comprises at least one conveyor belt and/or at least one GridSorter© and/or at least one automated guided vehicle. In particular, the transport mechanism may comprise multiple conveyor belts that connect to different make-up-places in the sorting area.

In a preferred embodiment, at least one make-up-place comprises one or more conveyor belt, preferably one or more circular conveyor belt. The conveyor belt may connect to a conveyor belt of the transport mechanism. The conveyor belt of the make-up-place may connect to one or more loading stations of the make-up-place. A make-up-place may additionally or alternatively comprise a GridSorter© to facilitate short term storing and sorting of luggage pieces.

In a preferred embodiment, at least one make-up-place comprises one or more loading stations, wherein each loading station comprises a parking spot for a movable load device as well as a loading means. The controller system may be adapted to keep a movable load device parked at a parking spot during loading of one or more luggage pieces. The controller system may be adapted to keep a movable load devices parked in a parking spot until they are considered "full" by the sorting system or all luggage of the means of transportation has been loaded unless a parking spot is required for another movable load device. In the case of several loading stations per make-up-place, selecting a make-up-place comprises selecting a certain loading station of the selected make-up-place even if this is not always specified. A parking spot is positioned directly at the loading station and serves as a "short-term parking spot" for the movable load device when it is waiting at the selected loading station of the selected make-up-place. The waiting storage in the sorting area serves as "long term parking".

The controller system may also be adapted to keep a movable load device parked at a loading station only temporarily as long as there is a luggage piece assigned to the movable load device and then move the movable load device to an intermediate storage of the sorting area (for example to allow the loading of an early dropped off luggage piece and still keep as many loading stations free as possible).

In a preferred embodiment, at least one loading station is arranged to semi-automatically, preferably fully-automatically, load sorted luggage pieces into a parked movable load device. Semi-automatically here means for example a loading means (like a robot arm or a loading platform) that is controllable by an operator on site or remotely. Fully-automatically may mean an automatically operating conveyor belt and/or robot arm, that transport luggage pieces into a parked movable load device without the need for direct control of an operator, e.g. using sensors. A make-up-placed may comprise different loading stations with manual, semi-automatic or fully-automatic loading means, e.g. to facilitate the loading of different kinds of luggage pieces, meaning for example manual loading for non-standard luggage.

In a preferred embodiment, at least one loading station comprises as a loading means at least one of a
  controllable robot arm for loading sorted luggage pieces into a parked movable load device,
  a fully automatic robot arm for loading sorted luggage pieces into a parked movable load device,
  a conveyor belt for transporting sorted luggage pieces next to a or into a parked movable load device,
  Thereby the sorted luggage pieces can be loaded onto the selected movable load device in a controlled manner.

In a preferred embodiment, the controller system can be adapted to operate and control a situation when a luggage piece is assigned to a first movable load device and the assigned first movable load device is not currently parked at a loading station and there is currently no empty loading station, then the controller system selects a second movable load device, that is currently parked at a selected loading station but does not have any assigned luggage piece, and moves this second movable load device away to free up the selected loading station, and then routes the assigned luggage piece and the assigned first movable load device to the selected empty loading station for loading.

In a preferred embodiment, the sorting system comprises one or more of:
  a weight sensor for determining the weight of a luggage piece, preferably arranged at a luggage input and/or at a make-up-place,
  a dimensional sensor for determining the spacial measurements and/or the volume of a luggage piece, preferably arranged at a luggage input and/or at a make-up-place and/or at a loading station.

With these sensors luggage-related sorting information can be acquired and stored to improve the sorting process and select the appropriate type of movable load device (e.g. with a standardized unit load device of the correct size attached). If a weight sensor is present both at the luggage input and at the make-up-place this can serve as a fail-safe for fault detection (e.g. loss of weight due to opened/broken luggage, mix-up in sorting, luggage jam, etc.). In case a change of weight has occurred, an operator can then be alerted to check the relevant luggage piece(s).

In a preferred embodiment, the controller system is adapted to take into account both
  the already loaded luggage pieces in a movable load device,
  as well as luggage pieces already assigned to but not yet loaded into a fitting movable load device,
  before deciding to assign a luggage piece to a particular movable load device. This way, overloading of a movable load device can be avoided as the controller system tracks both the current and an estimated target storage capacity after loading all assigned luggage pieces of each movable load device.

In a preferred embodiment, after the assignment of a luggage piece to a particular movable load device, the movable load device is assigned to a make-up-place and is then already positioned at the assigned make-up-place even when said luggage piece has not yet reached the assigned make-up-place. If another movable load device has been parked at the assigned make-up-place but is not expecting further luggage pieces in the foreseeable future, it is removed and moved to a waiting zone. For this, the controller system is adapted to take more than one luggage piece into account and to optimize the placement of the available movable load devices of the sorting system.

In another preferred embodiment, the controller system is adapted to remove a movable load device parked at a loading station from its loading station when there are no more luggage pieces expected even when said movable load device is not yet full or the means of transportation is not yet ready for loading. This frees up loading stations and the sorting system becomes more efficient.

In a preferred embodiment, the controller system is adapted to direct a fitting movable load device to a loading station of a make-up-place to load a sorted luggage piece if no other fitting movable load device is currently ready to load the sorted luggage piece. Fitting may here mean that the movable load device is currently assigned to the correct means of transportation for the luggage piece and the movable load device still has sufficient estimated weight capacity and/or volume capacity for the luggage piece to be assigned. Fitting may also mean a movable load device that is empty and currently not assigned to a means of transportation, i.e. the assignment of the first luggage piece to an empty movable load device also assigns the movable load device to the corresponding means of transportation for the luggage piece. In the latter case, the movable loading device may also be chosen to carry a standardized unit load device that fits to the means of transportation (e.g. a correct aircraft unit load device for the type of airplane).

The above task is also solved by a method for sorting luggage in a sorting system comprising:
  a transport mechanism, that transports the luggage pieces to be sorted from the at least one luggage input into a sorting area of the sorting system, and
  a controller system which receives at least one luggage-related sorting information for each luggage piece,
  wherein the sorting area comprises:
    at least one make-up-place with one or more loading stations, that is connected to the transport mechanism and sorts the plurality of luggage pieces according to at least one luggage-related sorting information,
    a plurality of movable load devices, that receive each at least one luggage piece, that is sorted by the at least one make-up-place according to the at least one luggage-related sorting information,
  wherein the controller system assigns each luggage piece according to at least one luggage-related information to a particular movable load device,
  wherein the controller system selects a loading station of a make-up-place for each luggage piece and sends the luggage piece to the selected loading station of the selected make-up-place to be loaded into the assigned movable load device
  wherein each assigned movable load device waits at the at least one make-up-place until it moves or is moved to the output area
  wherein waiting at the at least one make-up-place comprises waiting at the selected loading station of the selected make-up-place and being routed to a waiting storage in the sorting area if the sorting system does currently not expect further luggage pieces for the particular movable load device and the number of free loading stations at the at least one make-up-place is low or zero.

The Compact Floating Storage method allows to directly store the incoming luggage into MLDs, which are handled in a (floating) sorting area. Thus, early bag storage can be combined with the sorting process for on-time luggage. This enhances performance, reduces complexity of control, and increases the peak load that can be handled by the sorting system. Luggage pieces that have been dropped off at the luggage input are handled the same by the luggage sorting system irrespective of the time before departure of the means of transportation at which the luggage piece is dropped off.

In a preferred embodiment, the luggage pieces are sorted in the sorting area and assigned by the controller system to a particular movable load device according to one or more of the following luggage-related sorting information:
  destination,
  weight,
  volume, and
  special handling flags.

Some or all of this information can be acquired at the luggage input, e.g. by manual input of an operator (destination, special handling flags), a weight sensor 19a or a spacial sensor 19b. Special handling flags may for example be "bulky luggage", "live animal container", "handle with care", "priority unload", "connecting flight luggage" etc. Alternatively or additionally some of the luggage-related sorting information can be acquired or rechecked in the sorting area, e.g. at a make-up-place.

In a preferred embodiment, the controller system controls the routing of individual luggage pieces and a movable load device to each other at the loading station of the at least one make-up-place that are assigned to each other according to at least one luggage-related sorting information. The controller system can be structured an arranged to assign individual luggage pieces to movable load devices of an appropriate type and then have both move (unless an appropriate, not-full movable load device is already parked at a make-up-place) to a make-up-place to facilitate loading of the luggage piece. The controller system can also be arranged to control the reuse of used movable load devices coming from means of travel that have arrived or departed.

In a preferred embodiment, the controller system controls the routing of a particular kind and/or number of movable load devices to the loading station of the at least one make-up-place according to a calculated demand that takes into account at least one of a destination, a total weight, a total estimated volume, and special handling flags of individual luggage pieces. The demand can be estimated from the number of passengers of means of travel, the type of means of travel (e.g. different airplanes use different unit load devices) and the amount of non-standard luggage that has already been dropped off e.g. at a luggage input.

And/or the controller system directs the assigned particular movable load device to the selected loading station of the selected make-up-place during the approach of the assigned luggage piece to the sorting area.

In a preferred embodiment, at least one make-up-place comprises one or more loading stations, wherein each loading station comprises a parking spot for a movable load device as well as a loading means, wherein when a luggage piece is assigned to a movable load device and the assigned movable load device is not currently parked at a loading station, then the controller system selects an empty loading station and routes the assigned luggage piece and the assigned movable load device to the selected empty loading station for loading. The loading process is thus dynamic and allows to load a much larger number of luggage pieces in the same time and with the same size of the sorting area. It is thus not necessary to keep the movable load devices parked at a make-up-place until it is fully loaded, since the controller system can anticipate when it is necessary to move it to a parking spot to load an assigned luggage piece. The make-up-places can thus handle a larger number of moveable load devices and thus a larger number of means of transportation.

It is preferred, that when a luggage piece is assigned to a first movable load device and the assigned first movable load device is not currently parked at a loading station and there is currently no empty loading station, then the controller system selects a second movable load device, that is currently parked at a selected loading station but does not have any assigned luggage piece, and moves this second movable load device away to free up the selected loading station, and then routes the assigned luggage piece and the assigned first movable load device to the selected empty loading station for loading. Thereby each loading station can be used more effectively as movable load devices that are currently not waiting for an assigned luggage piece may be moved away to free up a loading station.

Any features and embodiments disclosed with respect to the sorting system may also be claimed with respect to the method and vice versa.

The characteristics, features and advantages of this invention described above and the way in which they are achieved become clearer and more comprehensible in the context of the following description of the embodiments, which are explained in more detail in the context of the appended drawings, wherein:

BRIEF DESCRIPTION OF THE FIGURE

The only FIGURE shows a schematic depiction of a sorting system and sorting method according to the invention.

DETAILED DESCRIPTION OF THE INVENTION

Figure 1:
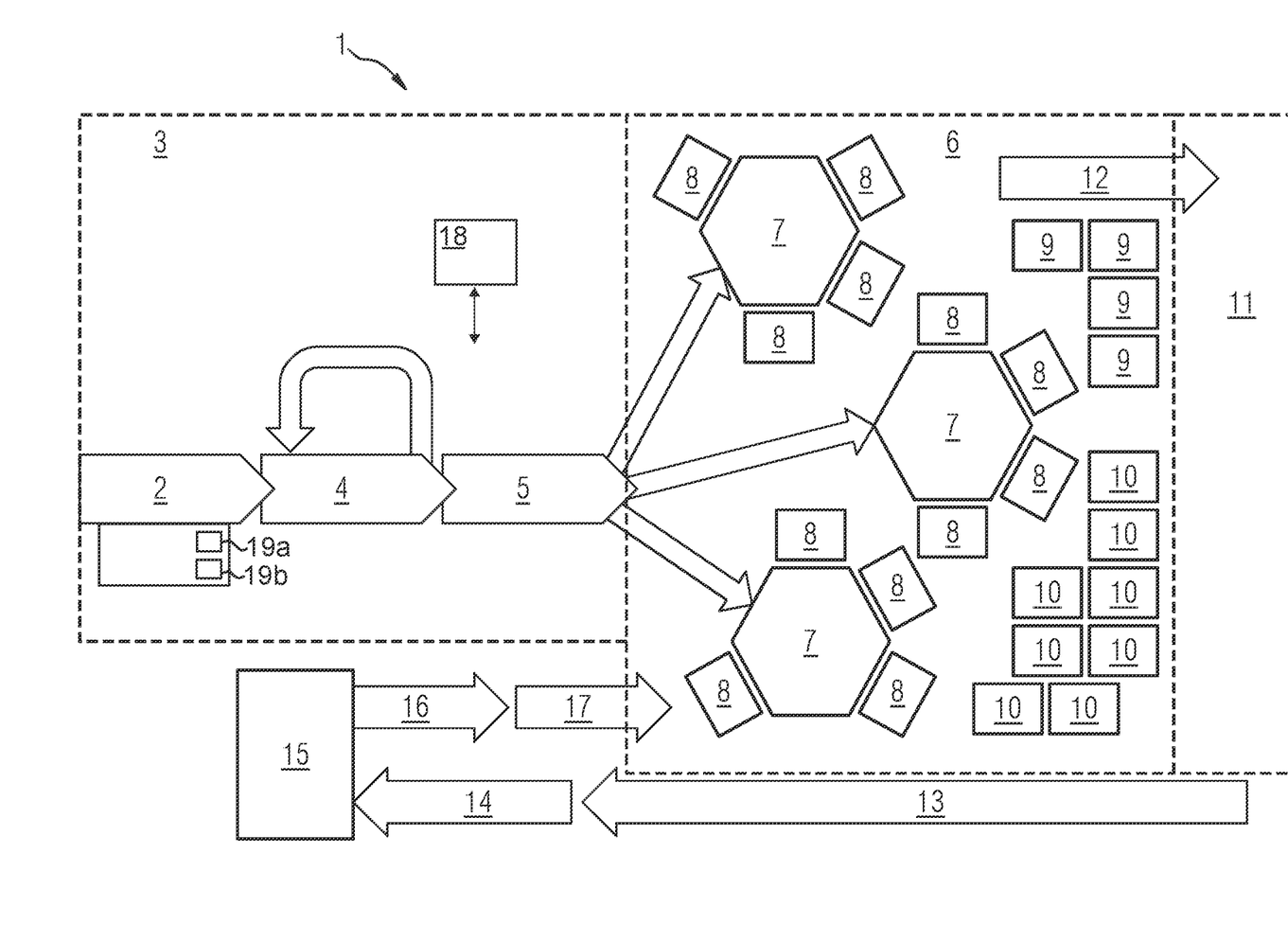

The only FIGURE shows a sorting system 1 for luggage according to the invention. The sorting system 1 comprises at least one luggage input at step 2 adapted to receive a plurality of luggage pieces to be sorted in the sorting system 1. The luggage input at step 2 is arranged in a bag handling system 3, that can be an ordinary bag handling system 3 as known in the state of the art for example on commercial airports using a plurality of luggage inputs and conveyor belts. Dropped off luggage pieces are (pre-)sorted (and optionally wait) in a transport mechanism in step 4 until they are routed by the transport system to a sorting area 6 in step 5.

The sorting area 6 comprises at least one make-up-place 7. Here three make-up-places 7 are shown, but any number like 1, 2, 3, 4, 5 or more is possible. The make-up-places 7 are connected to the transport mechanism and adapted to sort the plurality of luggage pieces according to at least one luggage-related sorting information. The luggage-related sorting information may for example be the destination, weight, (estimated) volume, and special handling flags.

The sorting area 6 further comprises a plurality of movable load devices 8, 9, 10 arranged to receive each at least one luggage piece sorted by the make-up-places 7 according to the at least one luggage-related sorting information.

The sorting system 1 comprises a controller system 18, which is adapted to receive at least one luggage-related sorting information for each luggage piece. The controller system 18 is adapted to assign each luggage piece according to at least one luggage-related sorting information to a particular movable load device 8, 9, 10. The controller system 18 is also adapted to select a make-up-place 7 for each luggage piece and to send the luggage piece to the selected make-up-place 7 to be loaded into the assigned movable load device 8, 9, 10.

At least some of the movable load devices 8, 9, 10 can be arranged to store sorted luggage pieces that have been dropped off at the luggage input in step 2 more than a predetermined time before a scheduled departure of the corresponding means of transportation.

The movable load devices 8 are currently parked at loading stations of the make-up-places 7 awaiting assigned luggage pieces. The movable load devices 9 are full or considered full as no further type of the same luggage is expected for the same means of transportation. The movable load devices 10 are not yet considered full, but have been temporarily moved away from a loading station for example because they carry early dropped off luggage and no further luggage pieces for the same means of transportation are assigned to the movable load devices 10 or are expected in the near future (e.g. several hours before departure of an airplane). A limited number of make-up-places 7 can thus service a far larger number of means of transportation at the same time.

The sorting system 1 also comprises an output area 11, adapted to receive in step 12 a plurality of sorted and assigned luggage pieces in (loaded) movable load devices 9 to be transported to different designated means of transportation.

Step 13 denotes the return of empty movable load devices from arrived means of transportation. In step 14 these movable load devices are sorted and, if necessary, cleaned and placed in a movable load device storage 15.

In step 16 a particular movable load device is requested by the controller system of the sorting system 1. This may include attaching a standardized unit load device to an automated guided vehicle carrying the standardized unit load device to form a movable load device 8, 9, 10 in the sorting system. The standardized unit load device may be detached from the movable load device when it is loaded onto a means of transportation (e.g. onto an airplane). In step 17 the assigned movable load device 8, 9, 10 in routed to the sorting area 6 to one of the make-up-places 7 to receive at least one assigned piece of sorted luggage.

Although the invention has been illustrated and described in detail by preferred embodiments, the invention is not limited by the disclosed examples and other variations can be derived by the skilled person without leaving the scope of protection of the invention.

LIST OF REFERENCE SIGNS

1 sorting system
2 step
3 bag handling system
4 step
5 step
6 sorting area
7 make-up-place
8 movable load device
9 movable load device
10 movable load device
11 output area
12 step
13 step
14 step
15 movable load device storage
16 step
17 step

The invention claimed is:

1. A sorting system for luggage, the sorting system comprising:
   a transport mechanism arranged to transport pieces of luggage to be sorted into a sorting area of the sorting system; and
   a controller system adapted to receive at least one item of luggage-related sorting information for each piece of luggage;
   wherein the sorting area includes:
      at least one make-up-place with two or more loading stations connected to said transport mechanism and configured to sort the piece of luggage according to the at least one item of luggage-related sorting information;
      a plurality of movable load devices configured to receive at least one piece of luggage sorted by the at least one make-up-place in accordance with the at least one item of luggage-related sorting information;

said controller system being configured to assign each piece of luggage according to the at least one item of luggage-related sorting information to a particular one of said movable load devices;

said controller system being configured to select a loading station of a make-up-place for each piece of luggage and to send the piece of luggage to the selected loading station of the selected make-up-place to be loaded into a respectively assigned said movable load device;

said particular movable load device being configured to wait at said at least one make-up-place until moving or being moved to an output area;

wherein, while said particular movable load device waits at said at least one make-up-place, said particular movable load device waits at the selected loading station of the selected make-up-place and is routed to a waiting storage in the sorting area by said controller system if the sorting system does not currently expect a further piece of luggage for said particular movable load device and a number of free loading stations at said at least one make-up-place is low or zero.

2. The sorting system according to claim 1, wherein said at least one movable load device is selected from the group consisting of at least one standardized aircraft unit load device, a semi-automatic movable load device, and a fully-automatic movable load device.

3. The sorting system according to claim 1, wherein said controller system is configured to direct the assigned said particular movable load device to the selected loading station of the selected make-up-place during an approach of the assigned piece of luggage to the sorting area.

4. The sorting system according to claim 1, wherein:
at least some of said movable load devices are configured to serve as intermediate storage units for sorted pieces of luggage that have been dropped off at said luggage input more than a predetermined time before a scheduled departure of a corresponding means of transportation; and
said at least some of said movable load devices are configured to wait at a make-up-place and/or in a waiting zone until moving or being moved to the output area.

5. The sorting system according to claim 1, wherein each said loading station comprises a parking spot for a movable load device and a loading means.

6. The sorting system according to claim 5, wherein:
at least one loading station is configured to semi-automatically load sorted pieces of luggage into a parked movable load device; and/or
at least one loading station comprises as a loading means at least one of the following:
a controllable robot arm for loading sorted pieces of luggage into a parked movable load device;
a fully automatic robot arm for loading sorted pieces of luggage into a parked movable load device;
a conveyor belt for transporting sorted pieces of luggage next to a parked movable load device.

7. The sorting system according to claim 6, wherein said at least one loading station is configured to fully automatically load the sorted pieces of luggage into the parked movable load device.

8. The sorting system according to claim 1, wherein said controller system is configured to operate and control a situation when a piece of luggage is assigned to a first movable load device and the assigned said first movable load device is not currently parked at a loading station and there is currently no empty loading station as follows:
selecting by the controller system a second movable load device, that is currently parked at a selected loading station but does not have any assigned piece of luggage;
moving the second movable load device away to free up the selected loading station; and
then routing the assigned piece of luggage and the assigned first movable load device to the selected empty loading station for loading.

9. The sorting system according to claim 1, further comprising one or more of:
a weight sensor for determining a weight of a piece of luggage; and
a dimensional sensor for determining spatial measurements and/or a volume of a piece of luggage.

10. The sorting system according to claim 9, wherein:
said weight sensor is disposed at a luggage input and/or at a make-up-place; and
said dimensional sensor is disposed at at least one of a luggage input, at a make-up-place, or at a loading station.

11. The sorting system according to claim 1, wherein said controller system is configured to take into account both
already-loaded pieces of luggage in a movable load device; and
pieces of luggage already assigned to but not yet loaded into a fitting movable load device;
before deciding to assign a piece of luggage to a particular movable load device.

12. The sorting system according to claim 1, wherein said controller system is configured to direct a fitting movable load device to a loading station of a make-up-place to load a sorted piece of luggage if no other fitting movable load device is currently available for loading the sorted piece of luggage.

13. A method for sorting luggage in a sorting system, the method comprising:
transporting, by a transport mechanism, pieces of piece of luggage to be sorted from a luggage input into a sorting area of the sorting system; and
receiving, by a controller system, at least one item of luggage-related sorting information for each piece of luggage;
wherein the sorting area includes:
at least one make-up-place with two or more loading stations, the at least one make-up place being connected to the transport mechanism and configured for sorting the pieces of luggage according to at least one item of luggage-related sorting information;
a plurality of movable load devices disposed to receive each piece of luggage, that is sorted by the at least one make-up-place according to the at least one item of luggage-related sorting information;
assigning, by the controller system, each piece of luggage according to at least one item of luggage-related information to a particular movable load device;
selecting, by the controller system, a loading station of a make-up-place for each piece of luggage and sending the piece of luggage to the selected loading station of the selected make-up-place to be loaded into an assigned movable load device;
waiting with each assigned movable load device at the at least one make-up-place until the load device moves or is moved to the output area;

wherein the step of waiting at the at least one make-up-place comprises waiting at the selected loading station of the selected make-up-place and being routed to a waiting storage in the sorting area if the sorting system does not currently expect further pieces of luggage for the particular movable load device and a number of free loading stations at the at least one make-up-place is low or zero.

14. The method according to claim 13, which comprises controlling with the controller system a routing of individual pieces of luggage and a movable load device to each other at the loading station of the at least one make-up-place that are assigned to each other according to the at least one item of luggage-related sorting information.

15. The method according to claim 13, which comprises:
controlling with the controller system a routing of a particular kind and/or number of movable load devices to the loading station of the at least one make-up-place in accordance with a calculated demand that takes into account at least one parameter selected from the group consisting of a destination, a total weight, a total estimated volume, and special handling flags of individual pieces of luggage;
and/or
directing with the controller system the assigned particular movable load device to the selected loading station of the selected make-up-place during an approach of the assigned piece of luggage toward the sorting area.

16. The method according to claim 13, wherein each loading station comprises a parking spot for a movable load device and a loading means and, when a piece of luggage is assigned to a movable load device and the assigned movable load device is not currently parked at a loading station, selecting with the controller system an empty loading station and routing the assigned piece of luggage and the assigned movable load device to the selected empty loading station for loading.

17. The method according to claim 16, which comprises:
when a piece of luggage is assigned to a first movable load device and the assigned first movable load device is not currently parked at a loading station and there is currently no empty loading station:
selecting with the controller system a second movable load device, that is currently parked at a selected loading station but does not have any assigned piece of luggage, and moving the second movable load device away to free up the selected loading station to form an empty loading station; and
routing the assigned piece of luggage and the assigned first movable load device to the selected empty loading station for loading.

* * * * *

UNITED STATES PATENT AND TRADEMARK OFFICE
CERTIFICATE OF CORRECTION

PATENT NO. : 11,666,945 B2
APPLICATION NO. : 17/765119
DATED : June 6, 2023
INVENTOR(S) : Philipp Pfeifer et al.

Page 1 of 1

It is certified that error appears in the above-identified patent and that said Letters Patent is hereby corrected as shown below:

On the Title Page

Item (73) should read:
(73) Assignee: Siemens Logistics GmbH, Nuernberg (DE)

Signed and Sealed this
Twenty-third Day of July, 2024

Katherine Kelly Vidal
*Director of the United States Patent and Trademark Office*